United States Patent
Meng et al.

(10) Patent No.: US 12,520,269 B2
(45) Date of Patent: Jan. 6, 2026

(54) POSITIONING BASED ON MULTIPLE MEASUREMENT REPORTS

(71) Applicant: Nokia Technologies Oy, Espoo (FI)

(72) Inventors: Yan Meng, Shanghai (CN); Tao Tao, Shanghai (CN); Ryan Keating, Chicago, IL (US); Jianguo Liu, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 352 days.

(21) Appl. No.: 18/033,688

(22) PCT Filed: Oct. 26, 2020

(86) PCT No.: PCT/CN2020/123634
§ 371 (c)(1),
(2) Date: Apr. 25, 2023

(87) PCT Pub. No.: WO2022/087779
PCT Pub. Date: May 5, 2022

(65) Prior Publication Data
US 2023/0397151 A1 Dec. 7, 2023

(51) Int. Cl.
*H04W 64/00* (2009.01)
*H04W 24/10* (2009.01)

(52) U.S. Cl.
CPC ........... *H04W 64/00* (2013.01); *H04W 24/10* (2013.01)

(58) Field of Classification Search
CPC ............................. H04W 64/00; H04W 24/10
See application file for complete search history.

(56) References Cited

U.S. PATENT DOCUMENTS

| | | | |
|---|---|---|---|
| 2012/0230219 A1 | 9/2012 | Pettersson et al. | |
| 2018/0070209 A1 | 3/2018 | Jain et al. | |
| 2018/0077679 A1* | 3/2018 | Lee | H04W 64/006 |
| 2018/0146332 A1 | 5/2018 | Opshaug et al. | |

(Continued)

FOREIGN PATENT DOCUMENTS

| | | |
|---|---|---|
| CN | 107517440 A | 12/2017 |
| CN | 109314945 A | 2/2019 |

(Continued)

OTHER PUBLICATIONS

Office Action received for corresponding Chinese Patent Application No. 202080106718.2, dated Oct. 31, 2024, 8 pages of Office Action and no page of translation available.

(Continued)

*Primary Examiner* — Kenneth T Lam
(74) *Attorney, Agent, or Firm* — Lippes Mathias LLP (57) ABSTRACT

Example embodiments of the present disclosure relate to devices, methods, apparatuses and computer readable storage media for positioning based on a plurality of measurement reports. In example embodiments, a first device performs measurement of a first subset of positioning reference signals (PRSs) from a set of PRSs. Based on the measurement of the first subset of PRSs, the first device generates a measurement report and sends the measurement report to a second device along with a report indication that the measurement report is generated based on measurement of a subset of PRSs from the set of PRSs. In this way, the measurement report latency may be reduced significantly.

17 Claims, 4 Drawing Sheets

(56) References Cited

U.S. PATENT DOCUMENTS

| | | | |
|---|---|---|---|
| 2019/0132816 A1* | 5/2019 | Xue | H04W 48/20 |
| 2019/0215084 A1 | 7/2019 | Nurminen et al. | |
| 2019/0353748 A1 | 11/2019 | Rydén et al. | |
| 2020/0267682 A1* | 8/2020 | Manolakos | H04L 5/0057 |
| 2020/0351813 A1* | 11/2020 | Manolakos | H04W 24/10 |
| 2021/0377698 A1* | 12/2021 | Manolakos | H04W 4/029 |
| 2022/0124535 A1* | 4/2022 | Manolakos | H04W 64/00 |
| 2023/0179956 A1* | 6/2023 | Wong | G01S 5/0081 455/456.1 |
| 2023/0336296 A1* | 10/2023 | Manolakos | H04L 5/0053 |
| 2023/0336299 A1* | 10/2023 | Manolakos | H04W 24/10 |

FOREIGN PATENT DOCUMENTS

| | | |
|---|---|---|
| CN | 109564271 A | 4/2019 |
| CN | 111756494 A | 10/2020 |
| EP | 3963971 A1 | 3/2022 |
| EP | 4193556 A1 | 6/2023 |
| EP | 4211847 A1 | 7/2023 |
| GB | 2586155 B | 10/2021 |
| WO | WO 2017/189709 A2 | 11/2017 |
| WO | 2018/111173 A1 | 6/2018 |
| WO | WO 2019/027511 A1 | 2/2019 |
| WO | 2020/071992 A1 | 4/2020 |
| WO | 2020/163983 A1 | 8/2020 |
| WO | 2020/222956 A1 | 11/2020 |
| WO | 2022/031974 A1 | 2/2022 |
| WO | 2022/055613 A1 | 3/2022 |

OTHER PUBLICATIONS

Office Action received for corresponding Chinese Patent Application No. 202080106718.2, dated Feb. 28, 2025, 5 pages of Office Action and no page of translation available.

"3rd Generation Partnership Project; Technical Specification Group Radio Access Network; Evolved Universal Terrestrial Radio Access (E-UTRA); LTE Positioning Protocol (LPP) (Release 15)", 3GPP TS 36.355, V15.5.0, Sep. 2019, pp. 1-224.

"3rd Generation Partnership Project; Technical Specification Group Services and System Aspects; Functional stage 2 description of Location Services (LCS) (Release 16)", 3GPP TS 23.271, V16.0.0, Jul. 2020, pp. 1-188.

"New SID on NR Positioning Enhancements", 3GPP TSG RAN Meeting #86, RP-193237, Agenda Item: 9.1.1, Qualcomm Incorporated, Dec. 9-12, 2019, 4 pages.

"RAN1 Chairman's Notes", 3GPP TSG RAN WG1 Meeting #101-e, May 25-Jun. 5, 2020, 265 pages.

"RAN1 Chairman's Notes", 3GPP TSG RAN WG1 Meeting #102-e, Aug. 17-28, 2020, 204 pages.

"Potential Enhancements for NR Rel-17 Positioning", 3GPP TSG RAN WG1 #102-e, R1-2006810, Agenda item: 8.2.3, Qualcomm Incorporated, Aug. 17-28, 2020, pp. 1-21.

"3rd Generation Partnership Project; Technical Specification Group Radio Access Network; NR; Physical layer procedures for control (Release 16)", 3GPP TS 38.213, V16.2.0, Jun. 2020, pp. 1-176.

"3rd Generation Partnership Project; Technical Specification Group Radio Access Network; NR; Physical layer procedures for data (Release 16)", 3GPP TS 38.214, V16.2.0, Jun. 2020, pp. 1-163.

"3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305, V16.1.0, Jul. 2020, pp. 1-114.

"3rd Generation Partnership Project; Technical Specification Group Services and System Aspects; 5G System (5GS) Location Services (LCS); Stage 2 (Release 16)", 3GPP TS 23.273, V16.4.0, Jul. 2020, pp. 1-96.

Office Action received for corresponding Chinese Patent Application No. 202080106718.2, dated May 30, 2024, 11 pages of Office Action and no page of translation available.

"Summary #2 of UE and gNB measurements for NR Positioning", 3GPP TSG RAN WG1 #99, R1-1912147, Agenda Item: 7.2.10.1, CATT, Nov. 18-22, 2019, pp. 1-25.

"Physical-layer procedures to support UE/gNB measurements", 3GPP TSG RAN WG1 #100-e, R1-2000642, Agenda item: 7.2.8.4, Samsung, Feb. 24-28, 2020, pp. 1-4.

Extended European Search Report received for corresponding European Patent Application No. 20958944.9, dated Jul. 15, 2024, 15 pages.

"Summary #2 of UE and gNB measurements for NR Positioning", 3GPP TSG RAN WG1 #98bis, R1-1911531, Agenda Item: 7.2.10.1, CATT, Oct. 14-18, 2019, pp. 1-33.

"3rd Generation Partnership Project; Technical Specification Group Radio Access Network; LTE Positioning Protocol (LPP) (Release 16)", 3GPP TS 37.355, V16.2.0, Sep. 2020, pp. 1-296.

* cited by examiner

POSITIONING BASED ON MULTIPLE MEASUREMENT REPORTS

CROSS REFERENCE TO RELATED APPLICATION

This patent application is a U.S. National Stage application of International Patent Application Number PCT/CN2020/123634 filed Oct. 26, 2020, which is hereby incorporated by reference in its entirety.

FIELD

Example embodiments of the present disclosure generally relate to the field of communications, and in particular, to devices, methods, apparatuses and computer readable storage media for positioning based on a plurality of measurement reports.

BACKGROUND

For New Radio (NR) positioning enhancement, higher accuracy location requirement is provided for new applications and industry verticals. In Release 17 (Rel-17), the accuracy of less than one meter is required for general commercial use cases. For Industrial Internet of Things (IIoT) applications, the accuracy of less than 20 cm is required. The target latency requirement is less than 100 ms while for IIoT applications an order of 10 ms is desired.

Latency enhancement is one of crucial topics in the NR positioning enhancement. In order to reduce NR positioning latency, more efficient signaling and procedures may be provided for a device to request and report positioning related information. The positioning related information may include a request for location information (for example, including assistance data), a report of location information such as a measurement report, and the like. The positioning related information may also relate to downlink (DL) positioning reference signal (PRS) and/or uplink (UL) sounding reference signal (SRS) configuration, activation or triggering.

However, positioning architecture enhancement is not analyzed to enable such more efficient signaling and procedures. Moreover, it is not involved whether a location service (LCS) architecture specified in the 3rd Generation Partnership Project (3GPP) standards such as 3GPP TS 23.273 is enhanced or not.

SUMMARY

In general, example embodiments of the present disclosure provide devices, methods, apparatuses and computer readable storage media for positioning based on a plurality of measurement reports.

In a first aspect, a first device is provided which comprises at least one processor and at least one memory including computer program code. The at least one memory and the computer program code are configured to, with the at least one processor, cause the first device to perform measurement of a first subset of positioning reference signals from a set of positioning reference signals. The first device is further caused to generate a measurement report based on the measurement of the first subset of positioning reference signals and send, to a second device, the measurement report and a report indication that the measurement report is generated based on measurement of a subset of positioning reference signals from the set of positioning reference signals.

In a second aspect, a second device is provided which comprises at least one processor and at least one memory including computer program code. The at least one memory and the computer program code are configured to, with the at least one processor, cause the second device to receive, from a first device, a measurement report and a report indication that the measurement report is generated based on measurement of a first subset of positioning reference signals from a set of positioning reference signals. The second device is further caused to determine, using the report indication, a location of the first device at least in part based on the measurement report.

In a third aspect, a method is provided. In the method, a first device performs measurement of a first subset of positioning reference signals from a set of positioning reference signals. Based on the measurement of the first subset of positioning reference signals, the first device generates a measurement report and sends the measurement report to a second device along with a report indication that the measurement report is generated based on measurement of a subset of positioning reference signals from the set of positioning reference signals.

In a fourth aspect, a method is provided. In the method, from a first device, a second device receives a measurement report and a report indication that the measurement report is generated based on measurement of a first subset of positioning reference signals from a set of positioning reference signals. Using the report indication, the second device determines a location of the first device at least in part based on the measurement report.

In a fifth aspect, there is provided an apparatus comprising means for performing the method according to the third or fourth aspect.

In a sixth aspect, there is provided a computer readable storage medium comprising program instructions stored thereon. The instructions, when executed by a processor of a device, cause the device to perform the method according to the third or fourth aspect.

It is to be understood that the summary section is not intended to identify key or essential features of example embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Principle of the present disclosure will now be described with reference to some example embodiments. It is to be understood that these example embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" or "user equipment" (UE) refers to any terminal device capable of wireless communications with each other or with the base station. The communications may involve transmitting and/or receiving wireless signals using electromagnetic signals, radio waves, infrared signals, and/or other types of signals suitable for conveying information over air. In some example embodiments, the UE may be configured to transmit and/or receive information without direct human interaction. For example, the UE may transmit information to the base station on predetermined schedules, when triggered by an internal or external event, or in response to requests from the network side.

Examples of the UE include, but are not limited to, smart phones, wireless-enabled tablet computers, laptop-embedded equipment (LEE), laptop-mounted equipment (LME), wireless customer-premises equipment (CPE), sensors, metering devices, personal wearables such as watches, and/or vehicles that are capable of communication. For the purpose of discussion, some example embodiments will be described with reference to UEs as examples of the terminal devices, and the terms "terminal device" and "user equipment" (UE) may be used interchangeably in the context of the present disclosure.

As used herein, the term "network device" refers to a device via which services can be provided to a terminal device in a communication network. As an example, the network device may comprise a base station. As used herein, the term "base station" (BS) refers to a network device via which services can be provided to a terminal device in a communication network. The base station may comprise any suitable device via which a terminal device or UE can access the communication network. Examples of the base stations include a relay, an access point (AP), a transmission point (TRP), a node B (NodeB or NB), an evolved NodeB (eNodeB or eNB), a New Radio (NR) NodeB (gNB), a Remote Radio Module (RRU), a radio header (RH), a remote radio head (RRH), a low power node such as a femto, a pico, and the like.

As used herein, the term "location server" refers to a device capable of providing location services. As an example, the location server may be implemented separately from the base station, as a device in a core network of the communication network, such as an Evolved Serving Mobile Location Center (E-SMLC). As another example, the location server may be integrated into the base station as a functional component of the base station.

As used herein, the term "positioning reference signal" (PRS) refers to any reference signal that can be used for the positioning purpose. Examples of the PRSs may DL PRSs transmitted by a network device to a terminal device, a UL SRS transmitted by a terminal device to a network device, or other PRSs of other types. In various embodiments of the present disclosure, the PRS may be configured in a periodic, semi-periodic or aperiodic or dynamic manner.

As used herein, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular base station, or other computing or base station.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As used herein, the terms "first", "second" and the like may be used herein to describe various elements, these elements should not be limited by these terms. These terms are only used to distinguish one element from another. For example, a first element could be referred to as a second element, and similarly, a second element could be termed a first element, without departing from the scope of example embodiments. As used herein, the term "and/or" includes any and all combinations of one or more of the listed terms.

In NR, latency of less than 100 ms is considered. In addition, some end-to-end latency requirements are provided for user equipment (UEs). For example, in Rel-17, target positioning requirements for commercial use cases are defined as follows:
Horizontal position accuracy (<1 m) for [90%] of UEs
Vertical position accuracy (<[2 or 3] m) for [90%] of UEs
End-to-end latency for position estimation of a UE (<[100 ms])

Moreover, target positioning requirements for IIoT use cases are defined in Rel-17 as follows:

Horizontal position accuracy (<1 m) for [90%] of UEs X=[0.2 or 0.5] m     Vertical position accuracy (<Y m) for [90%] of UEs Y=[0.2 or 1]m     End-to-end latency for position estimation of a UE (<[10 ms, 20 ms, or 100 ms])

It is still for further study (FFS) that physical layer latency for position estimation of a UE is less than 10 ms in both general commercial use cases and IIoT use cases. It is to be noted that the target positioning requirements may not necessarily be reached for all scenarios.

As described above, latency enhancement is one of the crucial topics in the Rel-17 NR positioning enhancement. The end-to-end positioning latency includes positioning latency on both a physical layer and higher layers. The physical layer latency may involve a time period of triggering location measurement and/or reporting, a time span of a PRS (or SRS) instance, a time period of measuring PRSs to derive a measurement result and report it to a serving NR NodeB (gNB) and so on. The higher layer latency may involve a time period of receiving the measurement result, performing positioning computation and transmitting positioning information to a location client. Accordingly, the positioning latency may need to be reduced on both the physical layer and the higher layers.

In the current 3GPP standards, a Long Term Evolution (LTE) Positioning Protocol (LPP) session is used between a location server and a target device to transmit a location request and response or to transfer assistance data to obtain location related measurements and a location estimate of the target device. A single LPP session is used to support a single location request such as a Mobile Originated Location Request (MT-LR), a Mobile Terminated Location Request (MO-LR) or a Network Induced Location Request (NI-LR). Multiple LPP sessions can be used between the same endpoints to support multiple different location requests, for example, as required in 3GPP TS 23.271.

Each LPP session comprises one or more LPP transactions, and each LPP transaction performs a single operation with respect to capability exchange, assistance data transfer, location information transfer, or the like. In an Evolved Universal Terrestrial Radio Access Network (E-UTRAN) or a Next-Generation Radio Access Network (NG-RAN), the LPP transactions are implemented as LPP procedures. The initiator of an LPP session generally initiates the first LPP transaction, and subsequent transactions may be initiated by either end. LPP transactions within a session may occur serially or in parallel. LPP transactions may be indicated at the LPP protocol level with a transaction identifier (ID) in order to associate messages with one another (such as a request and a response). Messages within a transaction are linked by a common transaction ID.

For a target UE, it would be crucial to provide not only higher positioning accuracy, but also lower latency for some use cases such as IIoT use cases. In order to reduce NR positioning latency to meet the lower latency requirement, more efficient signaling and procedures are expected for a device to report location information such as a measurement report.

Most of the positioning technologies, including, for example, timing-based technology and angle-based technology, utilize measurements of reference signals. For example, the DL time difference of arrival (DL-TDOA) technology requires a UE to receive PRSs from multiple base stations and then report to a location server measured time of arrival (ToA) of reference signals in the form of Reference Signal Time Difference (RSTD). Based on the reported information from the UE, the location server may use a multi-literation algorithm to derive positioning information of the UE and report the result to a location client.

In the current 3GPP standards, the location server may provide to a UE PRS configurations for a list of cells and expect the UE to report measurements on all of cells that can be measured by the UE (within UE capability). In general, the location server is unaware of positioning measurement qualities of the individual neighbor cells in advance. Accordingly, the location server would try to configure an enough number of neighbor cells for the target UE to satisfy the positioning performance requirement. For example, in NR, up to 24 neighbor cells belonging to the same or different frequency layers may be configured to the UE for positioning measurements so as to provide considerably accurate positioning performance. However, a time length for PRS measurement would be very long due to a large number of measured gNBs.

In addition, a large number of PRS resources may be allocated for each gNB, which may further increase the time length for the PRS measurement. For example, multiple beams may need to be measured per gNB, especially, for Frequency Range 2 (FR2). DL PRS resource sets may be introduced to facilitate beam sweeping of a PRS for operation in FR2. For example, if the UE needs to measure 8 cells and the PRS is sent from each cell in 8 beams, then the UE may need to measure up to 64 PRS resources. Moreover, if the UE needs to perform receiving (RX) beam sweeping on some of the cells, even more PRS measurements will be required.

Currently PRS transmissions from multiple gNBs may fall into different PRS occasions. In the current 3GPP standards, the UE will prepare a measurement report after all the measurements have been completed. For example, slot #1 may be configured for gNBs #1, #2, #3 and #4, and slot #4 may be configured for gNBs #5, #6, #7 and #8. In this case, the UE would prepare and send a measurement report after slot #4, for example, in slot #6 when all the measurements have been completed. The multiple PRS occasions may further delay the PRS measurements.

As a result, on one hand, the UE should wait to measure the PRSs from all the configured cells, and then start to prepare data and further report the total measurement results in a measurement report to the location server. This would result in the physical layer latency on a physical layer. On the other hand, a location server such as a location management function (LMF) would wait to decode and process the measurement results until receiving all components of the measurement report, for example, with the same LPP transaction ID, which would result in the higher layer latency.

The inventors notice that although measurement for more cells may achieve higher positioning accuracy, measurements for a part of configured neighbor cells may be enough for some use cases with the lower accuracy requirement or in the case that the higher accuracy requirement has already be met with the measurement for a smaller number of cells. For example, the accuracy requirement may be already met when the UE measures 4 PRSs with higher qualities. Accordingly, there is no need to measure further neighbor cells. However, in a network originated positioning procedure, a location service request from a location client is transparent for the target UE, and thus the UE cannot report the measurement results until it has finished the PRS measurement for all the configured neighbor cells. This will lead to unnecessary latency.

Example embodiments of the present disclosure provide an enhanced measurement report mechanism to reduce the latency of reporting the positioning measurement result. This mechanism allows a device to send a plurality of measurement reports in response to one received location information request. Specifically, after the device can segment the PRS measurement. After measurement is performed for a part of positioning reference signals (PRSs), the device generates and sends a measurement report based on the corresponding measurement result. In the context of the present disclosure, the measurement for a part or subset of PRSs may also be referred to as partial measurement, and the corresponding measurement result may also be referred to as a partial measurement result.

The mechanism can be used by either a terminal device such as a UE, or a base station such as a gNB to report the measurement report to a location server or other positioning devices. Accordingly, the location server can determine a location of a target device based on the partial measurement result without waiting for further measurement results. In this way, the measurement report latency may be reduced significantly.

Figure 1:
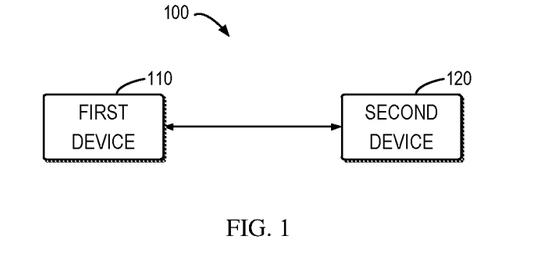
FIG. 1 illustrates an example environment in which example embodiments of the present disclosure can be implemented.

FIG. 1 shows an example environment 100 in which example embodiments of the present disclosure can be implemented.

The environment 100, which may be a part of a communication network, comprises a first device 110 for performing positioning related measurement. The first device 110 may be implemented by any suitable device in the communication network. For example, the first device 110 may be implemented by a terminal device, such as a UE, to measure DL positioning reference signals. As another example, the first device 110 may be implemented by a base station, such as a gNB, to measure UL positioning reference signals such as SRSs.

The environment 100 further comprises a second device 120 for performing the positioning function. The second device 120 may be implemented by a location server or a LMF or any other positioning devices. In the context of the present disclosure, the location server or LMF may be implemented as an element separate from or physically integrated with a base station such as a gNB. For example, in some example embodiments, the location server or LMF may be physically integrated with the gNB. In this example, the second device 120 may be implemented by a gNB with the location management function. As another example, the location server or LMF may be implemented at a core network device such as an Evolved Serving Mobile Location Center (E-SMLC).

Just for the purpose of discussion, in some example embodiments, a UE will be taken as an example of the first device 110, and a location server will be taken as an example of the second device 120.

It is to be understood that two devices are shown in the environment 100 only for the purpose of illustration, without suggesting any limitation to the scope of the present disclosure. In some example embodiments, the environment 100 may comprise a further device such as a location client to exchange a location service request and response with the second device 120. Alternatively or in addition, in the example embodiments where the second device 120 is implemented by a core network device, the environment 100 may comprise an intermediate device (such as a base station) to transfer communications between the first and second devices 110 and 120.

In the environment 100, the first and second devices 110 and 120 can communicate with each other directly or indirectly via the intermediate device. For example, in the example embodiments where the first device 110 is implemented by a UE and the second device 120 is implemented by a gNB with the location management function, the first and second devices 110 and 120 can communicate directly with each other. In the example embodiment where the first device 110 is implemented by a UE and the second device 120 is a location server physically separated from a gNB, the first device 110 may communicate with the second device 120 via the gNB.

The communications in the environment 100 may follow any suitable communication standards or protocols, which are already in existence or to be developed in the future, such as Universal Mobile Telecommunications System (UMTS), long term evolution (LTE), LTE-Advanced (LTE-A), the fifth generation (5G) New Radio (NR), Wireless Fidelity (Wi-Fi) and Worldwide Interoperability for Microwave Access (WiMAX) standards, and employs any suitable communication technologies, including, for example, Multiple-Input Multiple-Output (MIMO), Orthogonal Frequency Division Multiplexing (OFDM), time division multiplexing (TDM), frequency division multiplexing (FDM), code division multiplexing (CDM), Bluetooth, ZigBee, and machine type communication (MTC), enhanced mobile broadband (eMBB), massive machine type communication (mMTC), ultra-reliable low latency communication (URLLC), Carrier Aggregation (CA), Dual Connection (DC), and New Radio Unlicensed (NR-U) technologies.

In various example embodiments, the first device 110 segments the PRS measurement to provide more measurement reports to the second device 120. Specifically, the first device 110 can measure a part of PRSs and provide a measurement reports to the second device 120. For example, in the example embodiments where the first device 110 is implemented by a UE, the first device 110 may perform PRS measurement for a part of gNBs (not all the gNBs) and then generates a measurement report accordingly. Alternatively or in addition, in the case that the first device 110 performs beam sweeping, the first device 110 may measure some broad beams first and then generate the corresponding measurement report.

By segmenting the PRS measurement, the first device 110 may send a plurality of measurement reports to the second device 120 in one transaction, for example. Accordingly, the first device 110 may prepare data for the measurement report based on the partial PRS measurement without waiting for subsequent PRS measurement, which may significantly reduce the whole latency of PRS measurement and reporting.

At the second device 120, positioning calculations may be performed based on the partial measurement results without waiting for the complete measurement results. Further, the second device 120 may provide positioning information or location information of the first device 110 without wait for the full PRS period, which may further reduce the latency for the location service.

Figure 2:
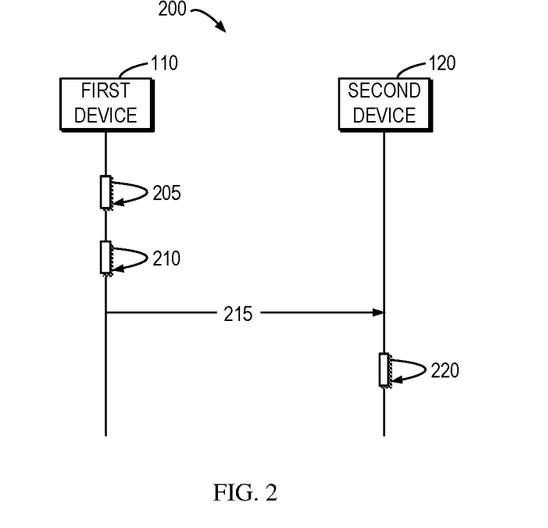
FIG. 2 illustrates a signaling flow according to some example embodiments of the present disclosure.

FIG. 2 shows a signaling flow 200 between the first and second devices 110 and 120 according to some example embodiments of the present disclosure. For the purpose of discussion, the signaling flow 200 will be described with reference to FIG. 1.

As shown in FIG. 2, the first device 110 performs (205) measurement of a subset of PRSs from a set of PRSs. The set of PRSs may comprise PRSs that are required or expected to be measured for positioning calculations. The total number of the PRSs to be measured may be configured at the network side. Then, the first device 110 generates (210) a measurement report based on the measurement of the subset of PRSs.

The subset of positioning reference signals may be selected by the first device 110 from the set of PRSs in any suitable rules. For example, in the example embodiments where the first device 110 is implemented by a UE, the first device 110 may select one or more of gNBs to be measured and measure the PRSs from the selected gNBs. Currently, PRS transmissions from multiple gNBs may fall into different PRS occasions. Accordingly, the first device 110 may select the gNBs in chronological order. For example, in the case that slot #1 is configured for gNBs #1, #2, #3 and #4 and slot #4 is configured for gNBs #5, #6, #7 and #8, the first device 110 may prepare a measurement report based on the measurement with respect to gNBs #1, #2, #3 and #4 after slot #1, for example, in slot #3. Then, the first device 110 may prepare a further measurement report based on the measurement of gNBs #5, #6, #7 and #8 after slot #4, for example, in slot #6.

In order to further reduce the measurement report latency, the selection of the gNBs may be based on a previous mobility measurement. For example, if the first device 110 knows that neighbor cells #1, #2 and #3 from one or more gNBs are the strongest cells, for example, with the highest Reference Signal Received Power (RSRP), the first device 110 may prioritize the PRS measurement for those cells. Thus, the best possible DL PRSs may be measured for the initial measurement report, thereby achieving a good measurement quality. Accordingly, at the second device 120, sufficient positioning accuracy may be achieved based on the partial measurement result. There may be no need for the second device 120 to consider the further measurement reports in positioning calculation, and therefore the latency of the measurement report may be further reduced. Example embodiments of the second device 120 will be discussed in the following paragraphs.

The PRS measurement and reporting may be performed by the first device 110 autonomously. For example, when the first device 110 needs a location service, the first device 110 may start the measurement and reporting. Alternatively or in addition, the measurement and reporting may be performed by the first device 110 periodically according to network configuration.

In some example embodiments, the first device 110 may obtain configuration with respect to the partial PRS measurement and reporting. For example, the configuration may comprise timing for a measure report, including, for example, the timing of the earliest or initial measurement report and a time interval for a subsequent measurement report. This timing may be related to the latency requirement. For example, in the use cases with the lower latency requirement, the very first measurement report may be sent earlier. Otherwise, the first measurement report may be sent later.

The configuration may further include a number of PRSs to be measured for the measurement report that may be related to the accuracy requirement. For example, if the accuracy requirement is higher, the number of PRSs to be measured per measurement report may be larger. Otherwise, the number of PRSs to be measured per measurement report may be smaller. In some example embodiments, the number of PRSs to be measured for the earliest measurement report may be configured to be larger to achieve a good measurement quality at the first time. Accordingly, the second device 120 can derive sufficient accurate positioning information based on the earliest measurement report, thereby further reducing the positioning latency.

The number of PRSs may be indicated in either an explicit or implicit way. For example, the number of PRSs may be indicated explicitly by a number of PRS resources. Accordingly, the first device 110 may perform measurement on the configured number of PRS resources. Alternatively or in addition, in the example embodiments where the PRSs are transmitted by gNBs, the number of PRSs may be indicated implicitly by a number of gNBs to be measured. Based on this configuration, only the PRSs from the configured number of gNBs may be measured by the first device 110 for the measurement report.

In some example embodiments, the configuration may include line-of-sight (LoS) or non-line-of-sight (NLoS) requirement of PRSs. For example, the configuration may indicate a confidence level in which the first device 110 is sure that the measured PRSs are in LoS. The confidence level may be indicated by a threshold. As an example, the configuration may indicate that the first device 110 should be Z % sure that the measured PRSs are in LoS where Z represents any suitable positive number.

The configuration may be obtained by the first device 110 in any suitable way. For example, the configuration may be statically, semi-statically or dynamically allocated or even predefined from the network side. In some example embodiments, the configuration may be broadcast periodically from the network side. In order to further reduce the overhead, in some other example embodiments, the configuration may be sent from the second device 120 when needed.

For example, in some example embodiments, the measurement of the PRSs may be performed by the first device 110 in response to a location information request from the second device 120. In this example, the configuration may be included in the location information request as assistance information, for example. Based on the received assistance information, the first device 110 may perform the partial PRS measurement and generate the corresponding measurement report.

The location information request sent by the second device 120 may be triggered by a location service request from a further device (referred to as a third device) such as a location client. For example, the second device 120 may receive a location service request for the first device 110 from the third device and then send a location information request to the first device 110. Further, the first device 110 starts to perform the PRS measurement.

As shown in FIG. 2, after the measurement report is generated (210), the first device 110 sends (215) the measurement report to the second device 120 along with a report indication that the measurement report is generated based on measurement of a subset of PRSs. The first device 110 may use a LPP message to carry the measurement report to provide the reference signal time difference (RSTD) measurements to the second device 120. Alternatively or in addition, the first device 110 may measure the signal strength of the subset of PRSs, such as Reference Signal Received Power (RSRP) and Reference Signal Received Quality (RSRQ) of a PRS, and send the measured signal strength of PRSs in the measurement report to the second device 120. Accordingly, the second device 120 may use the angle of departure (AoD)-based technology (such as the DL-AoD technology) for positioning.

In addition to the above measurements with respect to the PRSs, the first device 110 may measure receive-transmit (Rx-Tx) time differences such as a UE Rx-Tx time difference. Accordingly, the second device 120 may use the multiple roundtrip time (Multi-RTT) technology for positioning. In some example embodiments, the first device 110 may send a cell identifier such as Enhanced Cell ID (E-CID) to the second device 120 to indicate from which the PRSs are measured.

The report indication may be sent by the first device 110 in any suitable way. For example, the report indication may be included in the measurement report. It may be also possible that the report indication is sent in a separate LPP message.

Then, by using the report indication, the second device 120 determines (220) a location of the first device 110 based on the measurement report. For example, when a measurement report is received at the second device 120, the second device 120 may decode the measurement report and uses it to estimate the location of the first device 110. Based on the measurement data provided by the first device 110, the second device 120 may use the corresponding positioning technology for the location estimation. The scope of the present disclosure will not be limited in this regard.

If the measurement quality is good enough, the first device 110 may terminates the partial PRS measurement and reporting procedure. In some example embodiments, in order to further improve the positioning accuracy or meet different positioning accuracy requirements, the first device 110 may complete the measurement for all of the configured PRSs and send a plurality of measurement reports to the second device 120. For example, the first device 110 may perform further measurement of a further subset of PRSs and generate a further measurement report based on the further measurement. Different subset of PRSs for positioning measurement may or may not be overlapped. Moreover, the first device 110 may send an association indication to the second device 120 to indicate that the current measurement report is associated with one or more previous measurement reports. Accordingly, the second device 120 may use the plurality of measurement reports for positioning calculations to further improve the positioning accuracy.

In the case that the first device 110 will send a plurality of measurement reports, the first device 110 may indicate to the second device 120 that a plurality of measurement reports will be sent by the first device 110. Accordingly, the second device 120 can know that more measurement reports from the first device 110 may arrive. In addition, the first device 110 may further indicate how many measurement reports the first device 110 plans to report. For example, based on most recent reception of PRSs, if the first device 110 knows that it can detect PRSs from 12 cells, the first device 110 may determine the number of measurement reports to be sent and indicate it to the second device 120.

In some example embodiments, when a final one of the number of measurement reports is sent, the first device 110 may send an end flag to indicate that no more measurement reports will be sent. Based on this indication, the second device 120 can know that all the measurement reports are sent and can process the newly received measurement report along with previously stored measurement reports.

In some example embodiments, the first device 110 may send a transaction ID of the measurement report to associate the plurality of measurement reports with one another. This indication can tell the second device 120 that these measurement reports belong to a single transaction.

Alternatively or indication, the first device 110 may indicate a measured quality of the PRSs to the second device 120, including, for example, the minimum measurement quality (such as NR-TimingQuality) of the reported gNBs or PRS resources. This indication allows the second device 120 to determine whether to report the location estimate of the first device 110 to a location client. For example, if the measured quality is higher, the second device 120 may report the location estimate. This indication may also be used at the position calculation function for weighting the individual measurements. For example, the measurement report with a better quality may be assigned to a higher weight than a lower-quality measurement report.

The indication information with respect to a measurement report as discussed above may also be included in the report indication. It is to be understood that the report indication may include any other suitable indication information associated with the partial measurement report. Accordingly, the second device 120 may utilize this indication information when determining (220) the location of the first device 110. The second device 120 may report the location estimate to other devices such as a location client without waiting for the remaining measurement report. In addition, the second device 120 may indicate to the location client that this is a temporary result which may be updated or verified when a further measurement report is received from the first device 110.

Figure 3:
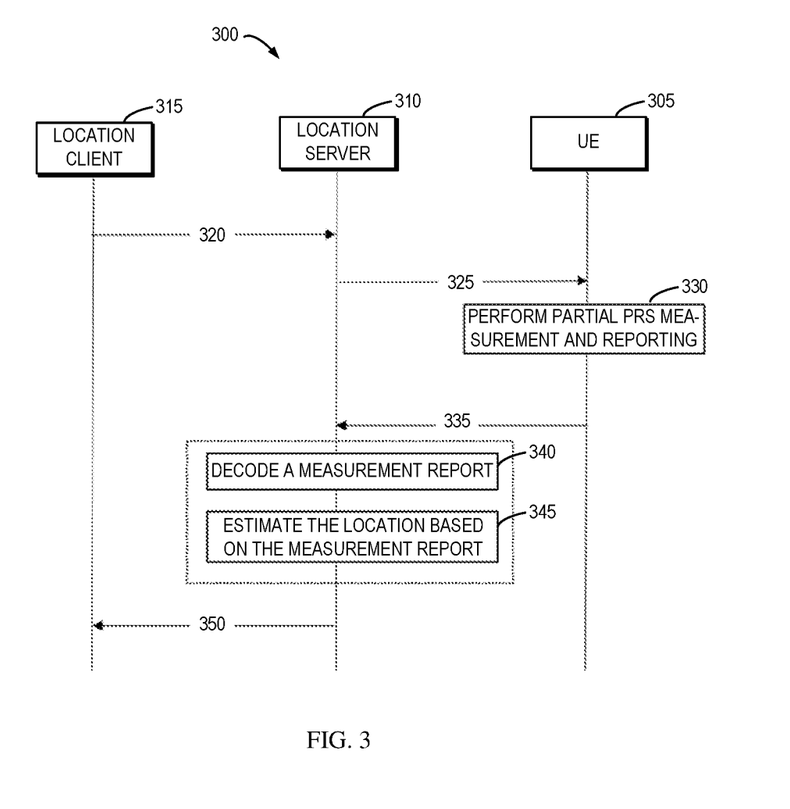
FIG. 3 illustrates an example process of a location service according to some example embodiments of the present disclosure.

FIG. 3 shows an example process 300 of a location service according to some example embodiments of the present disclosure. In this example, a UE 305 is an example implementation of the first device 110, and a location server 310 is an example implementation of the second device 120. A location client 315 acts as a device for initiating the location service.

As shown in FIG. 3, the location client 315 sends (320) to the location server 310 a location service request for the UE 305. Then, the location server 310 sends (325) a location information request to the UE 305. Along with or separately from the location information request, the location server 310 may send some configurations as the assistance information to guide the UE 305 to segment the PRS measurement. The configuration may include any suitable configuration such as the timing for the earliest report (which is related to the latency requirement) and the minimum number of measured gNBs or PRS resources for each measurement report (which is related to the accuracy requirement).

In some example embodiments, the configuration may include the minimum measurement quality (such as NR-TimingQuality) of the reported gNBs or PRS resources. For example, the UE 305 may need to report 3 RSTDs in downlink time difference of arrival (DL-TDOA) in a measurement report if the measurement quality of each RSTD is above a predetermined threshold. Alternatively or in addition, the configuration may include the LoS or NLoS requirement or threshold. For example, it may be indicated that the UE 305 may need to be Z % sure that all the gNBs are in LoS in the measurement report.

As shown in FIG. 3, in response to receiving the location information request from the location server 310, the UE 305 performs (330) partial PRS measurement and reporting. For example, the UE 305 may perform the partial PRS measurement and reporting based on the received assistance information from the location server 310 and may further provide several measurement reports sequentially to deliver the whole measurement results of all the configured gNBs.

For example, in the case that slot #1 is configured for gNBs #1, #2, #3, and #4 and slot #4 is configured for gNBs #5, #6, #7 and #8, the UE 305 may prepare and send the first measurement report after slot #1, for example, in slot #3, and then prepare and send the second measurement report after slot #4, for example, in slot #6.

In addition to reduction of the positioning latency, the partial PRS measurement and reporting may be performed in a way to improve the positioning accuracy. For example, the UE 305 may measure the best possible DL PRSs for the initial measurement report. For example, from a previous mobility measurement, if the UE 305 knows that neighbor cells #1, #2 and #3 are the strongest cells with the highest RSRP, the UE 305 may prioritize the measurement of the PRSs from those cells for inclusion in the initial measurement report.

Then, the UE 305 provides (335) the measurement report (including the RSTD measurement) to the location server 310. The measurement report may be carried in a LPP message. The UE 305 also sends the report indication (for example, included in the measurement report) to the location server 310 to indicate that this measurement report is generated based on partial PRS measurement and multiple measurement reports will be sent. Then, the location server 310 would know how to process the currently received measurement reports.

In some example embodiments, the report indication may include a transaction ID of the measurement report to tell the location server 310 that multiple reports belong to a single transaction. Alternatively or in addition, the report indication may include a measured quality of the PRSs to assist the location server 310 in determining whether to send the location estimation to the location client 315. For example, the location server 310 may send an initial estimate to the location client 315 based on the measurement report if the related quality is higher.

The report indication may alternatively or additionally include the total number of measurement reports to indicate the report times in one LPP transaction. This information can be included in the initial measurement report to indicate how many more measurement reports the UE 305 plans to send. For example, based on most recent PRS reception, if the UE 305 knows that it can monitor for 12 cells, the UE 305 may evaluate the number of measurement reports and tell the location server 310 about this in the first measurement report. Accordingly, the location server 310 may know that more measurements from some transaction will arrive.

The report indication may also include the end flag at the final measurement report to indicate that no more measurement reports will be sent. Based on this indication, the location server 310 can know that the whole reporting is completed and can process the newly received measurement report and any stored measurement report for the same session and transaction ID.

As shown in FIG. 3, upon reception of a measurement report from the UE 305, the location server 310 decodes (340) the measurement report. Then, the location server 310 estimates (345) the location of the UE 305 based on the measurement report. The decoding and estimating may be implemented cyclically. For example, as a measurement report is received at the location server 310, the location server 310 decodes and uses this report.

For some use cases with the lower accuracy requirement, the location server 310 may not need to use all of the measurement reports since the PRS measurement with respect to several gNBs may be enough to meet the positioning accuracy requirement. Accordingly, for some UEs, the location server 310 may estimate their locations based on the partial RSTD measurement. In some example embodiments, the location server 310 may calculate sufficiently accurate positioning information by using the very first measurement report.

Further, the location server 310 provides (350) the positioning information to the location client 315 while not waiting for the remaining measurement report. The location server 310 may also indicate to the location client 315 that this is a partial result which may be updated or verified when further information from the UE 305 is received. For example, the location server 310 may indicate to the location client 315 that a subsequent updated measurement result could be expected. In some example embodiments, the location server 310 may only report the location estimate once if the location server 310 has determined that the QoS of the location service has been met. In some other example embodiments, the location server 310 may wait for all the associated measurement reports before the positioning calculation to meet the positioning accuracy requirement.

Figure 4:
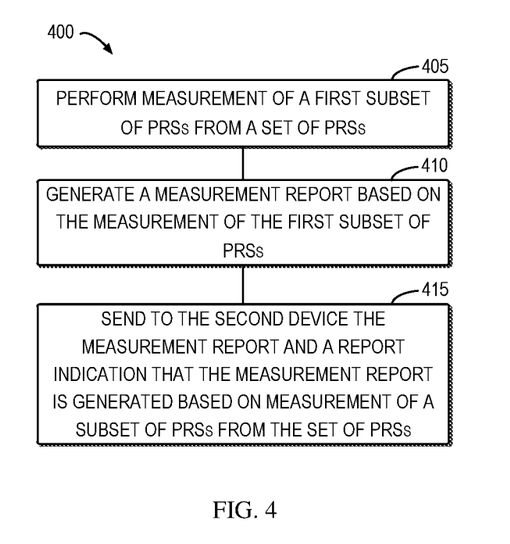
FIG. 4 illustrates a flowchart of an example method according to some example embodiments of the present disclosure.

FIG. 4 shows a flowchart of an example method 400 according to some example embodiments of the present disclosure. The method 400 can be implemented by the first device 110 as shown in FIG. 1. For the purpose of discussion, the method 400 will be described with reference to FIG. 1.

At block 405, the first device 110 performs measurement of a subset (referred to as a first subset) of PRSs from a set of PRSs. At block 410, the first device 110 generates a measurement report based on the measurement of the first subset of PRSs. At block 415, the first device 110 sends the measurement report to the second device 120 along with a report indication that the measurement report is generated based on measurement of a subset of PRSs.

In some example embodiments, the first device 110 may receive a location information request from the second device 120. Then, the first device 110 may perform the measurement of the subset of PRSs.

In some example embodiments, the first device 110 may perform the measurement for the subset of PRSs based on configuration associated with the measurement report. The configuration may be received from the second device 120. The configuration may comprising any suitable information, for example, including at least one of: timing for the measurement report, a number of devices, each sending one or more PRSs to be measured, a number of resources for PRSs to be measured for the measurement report, quality requirement of measurement of PRSs for the measurement report, or LoS requirement of PRSs for the measurement report.

In some example embodiments, the PRSs may be transmitted from a plurality of neighbor cells. The first device 110 may select one or more cells from the set of neighboring cells based on previously measured qualities of PRSs from the plurality of neighboring cells. Then, the first device 110 may determine PRSs transmitted from the selected one or more cells as the subset of PRSs to be measured for the measurement report, and perform measurement of the determined PRSs.

In some example embodiments, the first device 110 may perform further measurement of a further subset (referred to as a second subset) of PRSs and generate a further measurement report based on the further measurement. Further, the first device 110 may send the further measurement report to the second device 120 along with an association indication that the further measurement report is associated with the measurement report generated based on the measurement of the first subset of PRSs.

In some example embodiments, the report indication may comprise any suitable other information, for example, including at least one of: a transaction identification of the measurement report, a measured quality of the first subset of PRSs, the number of measurement reports to be sent, or an end flag of the number of measurement reports if the measurement report is a final one of the number of measurement reports.

Figure 5:
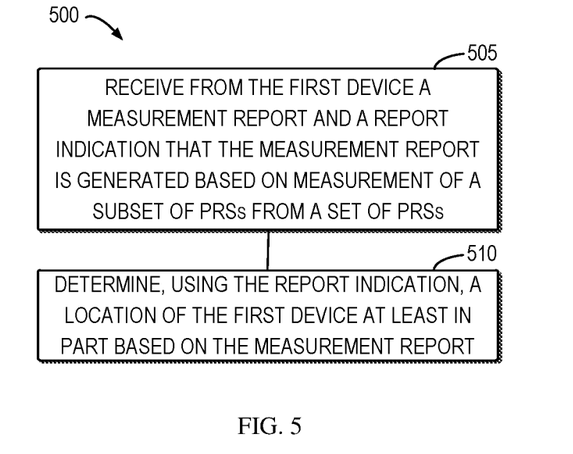
FIG. 5 illustrates a flowchart of an example method according to some other example embodiments of the present disclosure.

FIG. 5 shows a flowchart of an example method 500 according to some example embodiments of the present disclosure. The method 500 can be implemented by the second device 120 as shown in FIG. 1. For the purpose of discussion, the method 500 will be described with reference to FIG. 1.

At block 505, the second device 120 receives a measurement report from the first device 110 along with a report indication that the measurement report is generated based on measurement of a first subset of PRSs from a set of PRSs. At block 510, by using the report indication, the second device 120 determines a location of the first device 110 at least in part based on the measurement report.

In some example embodiments, the second device 120 may send a location information request to the first device 110. Then, the second device 120 may receive the measurement report in response to the location information request.

In some example embodiments, the second device 120 may receive a location service request for the first device 110 from a third device. Upon reception of the location service request, the second device 120 may send the location information request to the first device 110.

In some example embodiments, the second device 120 may determine positioning information of the first device 110 based on the determined location of the first device 110. Then, the second device 120 may send the positioning information of the first device 110 to the third device.

In some example embodiments, the second device 120 may send configuration associated with the measurement report to the first device 110 to enable the first device 110 to perform the measurement of the subset of PRSs. The configuration may comprise any suitable information, for example, including at least one of: timing for the measurement report, a number of devices, each sending one or more PRSs to be measured, a number of resources for PRSs to be measured for the measurement report, quality requirement of measurement of PRSs for the measurement report, or LoS requirement of PRSs for the measurement report.

In some example embodiments, the report indication may comprise any other suitable information, for example, including at least one of: a transaction identification of the measurement report, a measured quality of the first subset of PRSs, a number of measurement reports to be sent, or an end flag of the number of measurement reports if the measurement report is a final one of the number of measurement reports.

In some example embodiments, the second device 120 may receive a further measurement report from the first device 110 along with an association indication that the further measurement report is associated with the measurement report generated based on the measurement of the first subset of PRSs. The further measurement report is generated by the first device 110 based on further measurement of a second subset of PRSs from the set of PRSs. The second device 120 may determine the location of the first device 110 based on currently and previous received measurement reports.

In some example embodiments, after receiving a measurement report, the second device 120 may determine the location of the first device 110 based on the currently received measurement report. Upon reception of the further measurement report, the second device 120 may update the determined location of the first device 110 based on the further measurement report.

All operations and features as described above with reference to FIGS. 1-3 are likewise applicable to the methods 400 and 500 and have similar effects. For the purpose of simplification, the details will be omitted.

Figure 6:
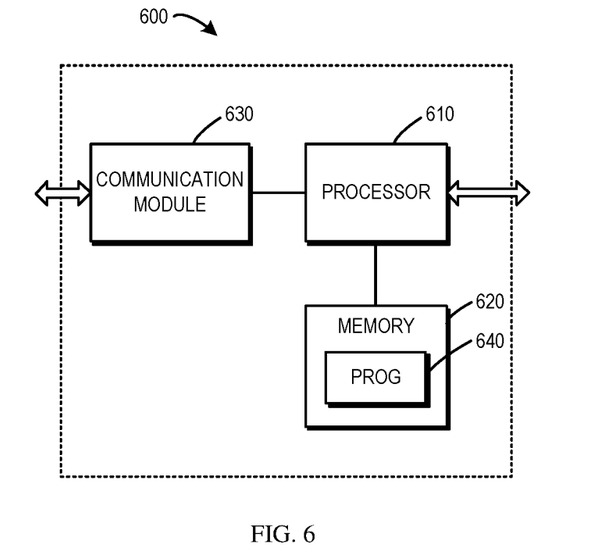
FIG. 6 illustrates a simplified block diagram of a device that is suitable for implementing example embodiments of the present disclosure.

FIG. 6 is a simplified block diagram of a device 600 that is suitable for implementing example embodiments of the present disclosure. The device 600 can be implemented at or as a part of the first device 110 or the second device 120 as shown in FIG. 1.

As shown, the device 600 includes a processor 610, a memory 620 coupled to the processor 610, a communication module 630 coupled to the processor 610, and a communication interface (not shown) coupled to the communication module 630. The memory 620 stores at least a program 640. The communication module 630 is for bidirectional communications, for example, via multiple antennas. The communication interface may represent any interface that is necessary for communication.

The program 640 is assumed to include program instructions that, when executed by the associated processor 610, enable the device 600 to operate in accordance with the example embodiments of the present disclosure, as discussed herein with reference to FIGS. 1-5. The example embodiments herein may be implemented by computer software executable by the processor 610 of the device 600, or by hardware, or by a combination of software and hardware. The processor 610 may be configured to implement various example embodiments of the present disclosure.

The memory 620 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 620 is shown in the device 600, there may be several physically distinct memory modules in the device 600. The processor 610 may be of any type suitable to the local technical network, and may include one or more of general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

When the device 600 acts as the first device 110 or a part of the first device 110, the processor 610 and the communication module 630 may cooperate to implement the method 400 as described above with reference to FIGS. 1-4. When the device 600 acts as the second device 120 or a part of the second device 120, the processor 610 and the communication module 630 may cooperate to implement the method 500 as described above with reference to FIGS. 1-3 and 5. All operations and features as described above with reference to FIGS. 1-5 are likewise applicable to the device 600 and have similar effects. For the purpose of simplification, the details will be omitted.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of example embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 400 or 500 as described above with reference to FIGS. 1-5. Generally, program modules include routines, programs, libraries, objects, classes, components, data structures, or the like that perform particular tasks or implement particular abstract data types. The functionality of the program modules may be combined or split between program modules as desired in various example embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), Digital Versatile Disc (DVD), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single embodiment. Conversely, various features that are described in the context of a single embodiment may also be implemented in multiple example embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various example embodiments of the techniques have been described. In addition to or as an alternative to the above, the following examples are described. The features described in any of the following examples may be utilized with any of the other examples described herein.

In some aspects, a first device comprises: at least one processor; and at least one memory including computer program code; the at least one memory and the computer program code configured to, with the at least one processor, cause the first device to: perform measurement of a first subset of positioning reference signals from a set of positioning reference signals; generate a measurement report based on the measurement of the first subset of positioning reference signals; and send, to a second device, the measurement report and a report indication that the measurement report is generated based on measurement of a subset of positioning reference signals from the set of positioning reference signals.

In some example embodiments, the first device is caused to perform the measurement of the first subset of positioning reference signals by: receiving a location information request from the second device; and in response to receiving the location information request, performing the measurement of the first subset of positioning reference signals.

In some example embodiments, the first device is caused to perform the measurement of the first subset of positioning reference signals by: performing the measurement for the first subset of positioning reference signals based on configuration associated with the measurement report.

In some example embodiments, the first device is further caused to: receive, from the second device, the configuration comprising at least one of: timing for the measurement report, a number of devices, each sending one or more positioning reference signals to be measured, a number of resources for positioning reference signals to be measured for the measurement report, quality requirement of measurement of positioning reference signals for the measurement report, or line-of-sight requirement of positioning reference signals for the measurement report.

In some example embodiments, the positioning reference signals are transmitted from a plurality of neighbor cells, and the first device is caused to perform the measurement of the first subset of positioning reference signals by: selecting one or more cells from the set of neighboring cells based on previously measured qualities of positioning reference signals from the plurality of neighboring cells; determining positioning reference signals transmitted from the selected one or more cells as the first subset of positioning reference signals; and performing measurement of the determined positioning reference signals.

In some example embodiments, the report indication further comprises at least one of: a transaction identification of the measurement report, a measured quality of the first subset of positioning reference signals, the number of measurement reports to be sent, or an end flag of the number of measurement reports if the measurement report is a final one of the number of measurement reports.

In some example embodiments, the first device is further caused to: perform further measurement of a second subset of positioning reference signals from the set of positioning reference signals; generate a further measurement report based on the further measurement of the second subset of positioning reference signals; and send, to the second device, the further measurement report and an association indication that the further measurement report is associated with the measurement report generated based on the measurement of the first subset of positioning reference signals.

In some aspects, a second device comprises: at least one processor; and at least one memory including computer program code; the at least one memory and the computer program code configured to, with the at least one processor, cause the second device to: receive, from a first device, a measurement report and a report indication that the measurement report is generated based on measurement of a first subset of positioning reference signals from a set of positioning reference signals; and determine, using the report indication, a location of the first device at least in part based on the measurement report.

In some example embodiments, the second device is caused to receive the measurement report by: sending a location information request to the first device; and receiving the measurement report in response to the location information request.

In some example embodiments, the second device is caused to send the location information request by: in response to receiving a location service request for the first device from a third device, sending the location information request to the first device.

In some example embodiments, the second device is further caused to: determine positioning information of the first device based on the determined location of the first device; and send the positioning information of the first device to the third device.

In some example embodiments, the second device is further caused to: send, to the first device, configuration associated with the measurement report to enable the first device to perform the measurement of the first subset of positioning reference signals, the configuration comprising at least one of: timing for the measurement report, a number of devices, each sending one or more positioning reference signals to be measured, a number of resources for positioning reference signals to be measured for the measurement report, quality requirement of measurement of positioning reference signals for the measurement report, or line-of-sight requirement of positioning reference signals for the measurement report.

In some example embodiments, the report indication further comprises at least one of: a transaction identification of the measurement report, a measured quality of the first subset of positioning reference signals, a number of measurement reports to be sent, or an end flag of the number of measurement reports if the measurement report is a final one of the number of measurement reports.

In some example embodiments, the second device is caused to determine the location of the first device at least in part based on the measurement report by: receiving, from the first device, a further measurement report and an association indication that the further measurement report is associated with the measurement report generated based on the measurement of the first subset of positioning reference signals, the further measurement report being generated based on further measurement of a second subset of positioning reference signals from the set of positioning reference signals; and determining the location of the first device based on the received measurement reports.

In some example embodiments, the second device is caused to determine the location of the first device based on the received measurement reports by: determining the location of the first device based on the measurement report generated based on the measurement of the first subset of positioning reference signals; and in response to receiving the further measurement report generated based on the measurement of the second subset of positioning reference signals, updating the determined location of the first device based on the further measurement report.

In some aspects, a method implemented at a first device comprises: performing measurement of a first subset of positioning reference signals from a set of positioning reference signals; generating a measurement report based on the measurement of the first subset of positioning reference signals; and sending, to a second device, the measurement report and a report indication that the measurement report is generated based on measurement of a subset of positioning reference signals from the set of positioning reference signals.

In some example embodiments, performing the measurement of the first subset of positioning reference signals comprises: receiving a location information request from the second device; and in response to receiving the location information request, performing the measurement of the first subset of positioning reference signals.

In some example embodiments, performing the measurement of the first subset of positioning reference signals comprises: performing the measurement for the first subset of positioning reference signals based on configuration associated with the measurement report.

In some example embodiments, the method further comprises: receiving, from the second device, the configuration comprising at least one of: timing for the measurement report, a number of devices, each sending one or more positioning reference signals to be measured, a number of resources for positioning reference signals to be measured for the measurement report, quality requirement of measurement of positioning reference signals for the measurement report, or line-of-sight requirement of positioning reference signals for the measurement report.

In some example embodiments, the positioning reference signals are transmitted from a plurality of neighbor cells, and performing the measurement of the first subset of positioning reference signals comprises: selecting one or more cells from the set of neighboring cells based on previously measured qualities of positioning reference signals from the plurality of neighboring cells; determining positioning reference signals transmitted from the selected one or more cells as the first subset of positioning reference signals; and performing measurement of the determined positioning reference signals.

In some example embodiments, the report indication further comprises at least one of: a transaction identification of the measurement report, a measured quality of the first subset of positioning reference signals, the number of measurement reports to be sent, or an end flag of the number of measurement reports if the measurement report is a final one of the number of measurement reports.

In some example embodiments, the method further comprises: performing further measurement of a second subset of positioning reference signals from the set of positioning reference signals; generating a further measurement report based on the further measurement of the second subset of positioning reference signals; and sending, to the second device, the further measurement report and an association indication that the further measurement report is associated with the measurement report generated based on the measurement of the first subset of positioning reference signals.

In some aspects, a method implemented at a second device comprises: receiving, from a first device, a measurement report and a report indication that the measurement report is generated based on measurement of a first subset of positioning reference signals from a set of positioning reference signals; and determining, using the report indication, a location of the first device at least in part based on the measurement report.

In some example embodiments, receiving the measurement report comprises: sending a location information request to the first device; and receiving the measurement report in response to the location information request.

In some example embodiments, sending the location information request comprises: in response to receiving a location service request for the first device from a third device, sending the location information request to the first device.

In some example embodiments, the method further comprises: determining positioning information of the first device based on the determined location of the first device; and sending the positioning information of the first device to the third device.

In some example embodiments, the method further comprises: sending, to the first device, configuration associated with the measurement report to enable the first device to perform the measurement of the first subset of positioning reference signals, the configuration comprising at least one of: timing for the measurement report, a number of devices, each sending one or more positioning reference signals to be measured, a number of resources for positioning reference signals to be measured for the measurement report, quality requirement of measurement of positioning reference signals for the measurement report, or line-of-sight requirement of positioning reference signals for the measurement report.

In some example embodiments, the report indication further comprises at least one of: a transaction identification of the measurement report, a measured quality of the first subset of positioning reference signals, a number of measurement reports to be sent, or an end flag of the number of measurement reports if the measurement report is a final one of the number of measurement reports; and determining, based on the measurement report, the location of the first device using the report indication.

In some example embodiments, determining the location of the first device at least in part based on the measurement report comprises: receiving, from the first device, a further measurement report and an association indication that the further measurement report is associated with the measurement report generated based on the measurement of the first subset of positioning reference signals, the further measurement report being generated based on further measurement of a second subset of positioning reference signals from the set of positioning reference signals; and determining the location of the first device based on the received measurement reports.

In some example embodiments, determining the location of the first device based on the received measurement reports comprises: determining the location of the first device based on the measurement report generated based on the measurement of the first subset of positioning reference signals; and in response to receiving the further measurement report generated based on the measurement of the second subset of positioning reference signals, updating the determined location of the first device based on the further measurement report.

In some aspects, an apparatus comprises: means for performing measurement of a first subset of positioning reference signals from a set of positioning reference signals; means for generating a measurement report based on the measurement of the first subset of positioning reference signals; and means for sending, to a second device, the measurement report and a report indication that the measurement report is generated based on measurement of a subset of positioning reference signals from the set of positioning reference signals.

In some example embodiments, the means for performing the measurement of the first subset of positioning reference signals comprises: means for receiving a location information request from the second device; and means for in response to receiving the location information request, performing the measurement of the first subset of positioning reference signals.

In some example embodiments, the means for performing the measurement of the first subset of positioning reference signals comprises: means for performing the measurement for the first subset of positioning reference signals based on configuration associated with the measurement report.

In some example embodiments, the apparatus further comprises: means for receiving, from the second device, the configuration comprising at least one of: timing for the measurement report, a number of devices, each sending one or more positioning reference signals to be measured, a number of resources for positioning reference signals to be measured for the measurement report, quality requirement of measurement of positioning reference signals for the measurement report, or line-of-sight requirement of positioning reference signals for the measurement report.

In some example embodiments, the positioning reference signals are transmitted from a plurality of neighbor cells, and the means for performing the measurement of the first subset of positioning reference signals comprises: means for selecting one or more cells from the set of neighboring cells based on previously measured qualities of positioning reference signals from the plurality of neighboring cells; means for determining positioning reference signals transmitted from the selected one or more cells as the first subset of positioning reference signals; and means for performing measurement of the determined positioning reference signals.

In some example embodiments, the report indication further comprises at least one of: a transaction identification of the measurement report, a measured quality of the first subset of positioning reference signals, the number of measurement reports to be sent, or an end flag of the number of measurement reports if the measurement report is a final one of the number of measurement reports.

In some example embodiments, the apparatus further comprises: means for performing further measurement of a second subset of positioning reference signals from the set of positioning reference signals; means for generating a further measurement report based on the further measurement of the second subset of positioning reference signals; and means for sending, to the second device, the further measurement report and an association indication that the further measurement report is associated with the measurement report generated based on the measurement of the first subset of positioning reference signals.

In some aspects, an apparatus comprises: means for receiving, from a first device, a measurement report and a report indication that the measurement report being generated by the first device based on measurement of a first subset of positioning reference signals from a set of positioning reference signals; and means for determining, using the report indication, a location of the first device at least in part based on the measurement report.

In some example embodiments, the means for receiving the measurement report comprises: means for sending a location information request to the first device; and means for receiving the measurement report in response to the location information request.

In some example embodiments, the means for sending the location information request comprises: means for in response to receiving a location service request for the first device from a third device, sending the location information request to the first device.

In some example embodiments, the apparatus further comprises: means for determining positioning information of the first device based on the determined location of the first device; and means for sending the positioning information of the first device to the third device.

In some example embodiments, the apparatus further comprises: means for sending, to the first device, configuration associated with the measurement report to enable the first device to perform the measurement of the first subset of positioning reference signals, the configuration comprising at least one of: timing for the measurement report, a number of devices, each sending one or more positioning reference signals to be measured, a number of resources for positioning reference signals to be measured for the measurement report, quality requirement of measurement of positioning reference signals for the measurement report, or line-of-sight requirement of positioning reference signals for the measurement report.

In some example embodiments, the report indication further comprises at least one of: a transaction identification of the measurement report, a measured quality of the first subset of positioning reference signals, a number of measurement reports to be sent, or an end flag of the number of measurement reports if the measurement report is a final one of the number of measurement reports.

In some example embodiments, the means for determining the location of the first device at least in part based on the measurement report comprises: means for receiving, from the first device, a further measurement report and an association indication that the further measurement report is associated with the measurement report generated based on the measurement of the first subset of positioning reference signals, the further measurement report being generated based on further measurement of a second subset of positioning reference signals from the set of positioning reference signals; and means for determining the location of the first device based on the received measurement reports.

In some example embodiments, the means for determining the location of the first device based on the received measurement reports comprises: means for determining the location of the first device based on the measurement report generated based on the measurement of the first subset of positioning reference signals; and means for in response to receiving the further measurement report generated based on the measurement of the second subset of positioning reference signals, updating the determined location of the first device based on the further measurement report.

In some aspects, a computer readable storage medium comprises program instructions stored thereon, the instructions, when executed by a processor of a device, causing the device to perform the method according to some example embodiments of the present disclosure.

What is claimed is:

1. A first device, comprising:
at least one processor; and
at least one non-transitory memory; storing instructions that, when executed with the at least one processor, cause the first device to:
perform measurement of a first subset of positioning reference signals comprising a part of positioning reference signals from a set of positioning reference signals comprising all positioning reference signals of neighbor cells configured to the first device for positioning measurements;
generate a measurement report based only on the measurement of the first subset of positioning reference signals; and
send, to a second device, the measurement report and a report indication that the measurement report is generated based on measurement of the first subset of positioning reference signals from the set of positioning reference signals,
wherein the instructions, when executed with the at least one processor, cause the first device to:
perform further measurement of a second subset of positioning reference signals from the set of positioning reference signals;
generate a further measurement report based on the further measurement of the second subset of positioning reference signals; and
send, to the second device, the further measurement report and an association indication that the further measurement report is associated with the measurement report generated based on the measurement of the first subset of positioning reference signals,
wherein the set of positioning reference signals is transmitted by a plurality of gNBs, and wherein the positioning reference signals of the first subset are transmitted before the positioning reference signals of the second subset and the measurement report is transmitted before performing the measurement of the second subset.

2. The first device of claim 1, wherein the instructions, when executed with the at least one processor, cause the first device to perform:
receiving a location information request from the second device; and
in response to receiving the location information request, performing the measurement of the first subset of positioning reference signals.

3. The first device of claim 1, wherein the instructions, when executed with the at least one processor, cause the first device to perform:
performing the measurement for the first subset of positioning reference signals based on a configuration associated with the measurement report.

4. The first device of claim 3, wherein the instructions, when executed with the at least one processor, cause the first device to:

receive, from the second device, the configuration comprising:
  timing for the measurement report,
  a number of devices sending one or more positioning reference signals to be measured,
  a number of resources for positioning reference signals to be measured for the measurement report,
  quality requirement of measurement of positioning reference signals for the measurement report, and
  line-of-sight requirement of positioning reference signals for the measurement report.

5. The first device of claim 1, wherein the report indication further comprises:
  a transaction identification of the measurement report,
  a measured quality of the first subset of positioning reference signals,
  the number of measurement reports to be sent, and
  an end flag of the number of measurement reports if the measurement report is a final one of the number of measurement reports.

6. A second device, comprising:
  at least one processor; and
  at least one non-transitory memory storing instructions that, when executed with the at least one processor, cause the second device to:
  receive, from a first device, a measurement report and a report indication that the measurement report is generated based on measurement of a first subset of positioning reference signals comprising a part of positioning reference signals from a set of positioning reference signals comprising all positioning reference signals of neighbor cells configured to the first device for positioning measurements; and
  determine, using the report indication, a location of the first device at least in part based on the measurement report,
  wherein the instructions, when executed with the at least one processor, cause the second device to determine the location of the first device at least in part based on the measurement report by:
  receiving, from the first device, a further measurement report and an association indication that the further measurement report is associated with the measurement report generated based on the measurement of the first subset of positioning reference signals, the further measurement report being generated based on further measurement of a second subset of positioning reference signals from the set of positioning reference signals; and
  determining the location of the first device based on the received measurement reports,
  wherein the set of positioning reference signals is transmitted by a plurality of gNBs, and wherein the positioning reference signals of the first subset are transmitted before the positioning reference signals of the second subset and the measurement report is transmitted before performing the measurement of the second subset,
  wherein the second device is caused to determine the location of the first device based on the received measurement reports by:
  determining the location of the first device based on the measurement report generated based on the measurement of the first subset of positioning reference signals, and
  in response to receiving the further measurement report generated based on the measurement of the second subset of positioning reference signals, updating the determined location of the first device based on the further measurement report.

7. The second device of claim 6, wherein the instructions, when executed with the at least one processor, cause the second device to perform:
  sending a location information request to the first device; and
  receiving the measurement report in response to the location information request.

8. The second device of claim 7, wherein instructions, when executed with the at least one processor, cause the second device to perform:
  in response to receiving a location service request for the first device from a third device, sending the location information request to the first device.

9. The second device of claim 8, wherein instructions, when executed with the at least one processor, cause the second device to:
  determine positioning information of the first device based on the determined location of the first device; and
  send the positioning information of the first device to the third device.

10. The second device of claim 6, wherein the instructions, when executed with the at least one processor, cause the second device to:
  send, to the first device, a configuration associated with the measurement report to enable the first device to perform the measurement of the first subset of positioning reference signals, the configuration comprising:
  timing for the measurement report,
  a number of devices sending one or more positioning reference signals to be measured,
  a number of resources for positioning reference signals to be measured for the measurement report,
  quality requirement of measurement of positioning reference signals for the measurement report, and
  line-of-sight requirement of positioning reference signals for the measurement report.

11. The second device of claim 6, wherein the report indication further comprises:
  a transaction identification of the measurement report,
  a measured quality of the first subset of positioning reference signals,
  a number of measurement reports to be sent, and
  an end flag of the number of measurement reports if the measurement report is a final one of the number of measurement reports.

12. A method implemented at a first device, comprising:
  performing measurement of a first subset of positioning reference signals comprising a part of positioning reference signals from a set of positioning reference signals comprising all positioning reference signals of neighbor cells configured to the first device for positioning measurements;
  generating a measurement report based only on the measurement of the first subset of positioning reference signals; and
  sending, to a second device, the measurement report and a report indication that the measurement report is generated based on measurement of a subset of positioning reference signals from the set of positioning reference signals,
  performing further measurement of a second subset of positioning reference signals from the set of positioning reference signals;

generating a further measurement report based on the further measurement of the second subset of positioning reference signals; and sending, to the second device, the further measurement report and an association indication that the further measurement report is associated with the measurement report generated based on the measurement of the first subset of positioning reference signals, wherein the set of positioning reference signals is transmitted by a plurality of gNBs, and wherein the positioning reference signals of the first subset are transmitted before the positioning reference signals of the second subset and the measurement report is transmitted before performing the measurement of the second subset.

13. The method of claim 12, wherein performing the measurement of the first subset of positioning reference signals comprises:

receiving a location information request from the second device; and in response to receiving the location information request, performing the measurement of the first subset of positioning reference signals.

14. The method of claim 12, wherein performing the measurement of the first subset of positioning reference signals comprises:

performing the measurement for the first subset of positioning reference signals based on a configuration associated with the measurement report.

15. The method of claim 14, further comprising:

receiving, from the second device, the configuration comprising:

timing for the measurement report, a number of devices sending one or more positioning reference signals to be measured, a number of resources for positioning reference signals to be measured for the measurement report, quality requirement of measurement of positioning reference signals for the measurement report, and line-of-sight requirement of positioning reference signals for the measurement report.

16. The method of claim 12, wherein the report indication further comprises:

a transaction identification of the measurement report, a measured quality of the subset of positioning reference signals, the number of measurement reports to be sent, and an end flag of the number of measurement reports if the measurement report is a final one of the number of measurement reports.

17. A non-transitory program storage device readable with an apparatus, tangibly embodying a program of instructions executable with the apparatus for performing the method of claim 12.

* * * * *